US011179900B2

(12) United States Patent
Lathrop et al.

(10) Patent No.: US 11,179,900 B2
(45) Date of Patent: Nov. 23, 2021

(54) LAMINATE SHEAR FORMING MACHINE WITH DYNAMIC PRESSURE ADJUSTMENT

(71) Applicant: The Boeing Company, Chicago, IL (US)

(72) Inventors: Mathew K. Lathrop, Orting, WA (US); Daniel C. Murphy, Edgewood, WA (US)

(73) Assignee: The Boeing Company, Chicago, IL (US)

( * ) Notice: Subject to any disclaimer, the term of this patent is extended or adjusted under 35 U.S.C. 154(b) by 252 days.

(21) Appl. No.: 16/291,341

(22) Filed: Mar. 4, 2019

(65) Prior Publication Data
US 2020/0282666 A1 Sep. 10, 2020

(51) Int. Cl.
*B29C 70/38* (2006.01)
*B29C 70/54* (2006.01)
*B29C 43/58* (2006.01)
*B29C 70/34* (2006.01)
*B21D 43/00* (2006.01)
*B21D 53/92* (2006.01)

(52) U.S. Cl.
CPC ............ *B29C 70/38* (2013.01); *B21D 43/003* (2013.01); *B21D 53/92* (2013.01); *B29C 43/58* (2013.01); *B29C 70/34* (2013.01); *B29C 70/54* (2013.01); *B29C 2043/5808* (2013.01)

(58) Field of Classification Search
CPC ......... B21D 53/92; B29C 70/34; B29C 43/10; B29L 2031/3076
See application file for complete search history.

(56) References Cited

U.S. PATENT DOCUMENTS 10,160,169 B1* 12/2018 Lutz .......................... B32B 7/14
2019/0308377 A1* 10/2019 Petrovski .............. B29C 66/863

\* cited by examiner

*Primary Examiner* — Nahida Sultana
*Assistant Examiner* — Debjani Roy
(74) *Attorney, Agent, or Firm* — Duft & Bornsen, PC

(57) ABSTRACT

Systems and methods are provided for designing composite parts. One embodiment is a laminate shear forming machine configured to shape a composite charge. The laminate shear forming machine includes a layup mandrel including a surface for shaping the composite charge, forming members configured to press the composite charge against the surface of the layup mandrel to shape the composite charge, and pressure sensing strips configured to measure pressure between the forming members and the composite charge. The laminate shear forming machine also includes a forming controller coupled to the pressure sensing strips and configured to determine that at least one forming member is applying pressure to the composite charge outside a pressure range, and to direct the at least one forming member to adjust from a first position to a second position to apply pressure to the composite charge within the pressure range.

20 Claims, 6 Drawing Sheets

LAMINATE SHEAR FORMING MACHINE WITH DYNAMIC PRESSURE ADJUSTMENT

FIELD

The disclosure relates to forming tools for composite parts, and in particular, to a laminate shear forming machine for composite parts.

BACKGROUND

Laminate shear forming machines are useful in modern aerospace applications for forming large composite parts such as aircraft spars. As opposed to a manual layup process in which layers of carbon fiber pre-preg materials are laid up and compacted into shape layer by layer, laminate shear forming machines use heat and pressure to rapidly contour and consolidate the layers of material into the desired shape for the part. However, since aircraft parts can have complex geometries designed to strict tolerances, it can be difficult to ensure that pressure applied by the laminate shear forming machine is precise and consistent throughout the length of the part.

SUMMARY

Embodiments described herein provide a laminate shear forming machine with dynamic pressure adjustment. In the laminate shear machine, pressure sensing strips are located at strategic locations along a length of the layup mandrel. The pressure sensing strips are disposed between the forming members and the composite charge to measure the pressure being applied by the forming members to shape the composite charge against the layup mandrel. If the pressure being applied is uneven along the length of the layup mandrel, the pressure sensing strips inform the laminate shear machine to adjustably position the forming members such that the pressure along the length of the layup mandrel is evenly applied.

One embodiment is a laminate shear forming machine for shaping a composite charge. The laminate shear forming machine includes a layup mandrel including a surface configured to shape the composite charge, forming members configured to press the composite charge against the surface of the layup mandrel to shape the composite charge, and pressure sensing strips configured to measure pressure between the forming members and the composite charge. The laminate shear forming machine also includes a forming controller coupled to the pressure sensing strips and configured to determine that at least one forming member is applying pressure to the composite charge outside a pressure range, and to direct the at least one forming member to adjust from a first position to a second position to apply pressure to the composite charge within the pressure range.

Another embodiment is a method of shaping a composite charge with a laminate shear forming machine. The method includes supporting the composite charge on a surface of a layup mandrel, positioning pressure sensing strips between the layup mandrel and forming members, actuating forming members to a predetermined position for shaping the composite charge against the surface of the layup mandrel, and monitoring, with the pressure sensing strips, pressure between the forming members and the composite charge. Further, in response to determining that at least one forming member in the predetermined position is applying pressure to the composite charge outside a pressure range, the method includes directing a positioning system to adjust the at least one forming member from the predetermined position to an adjusted position that applies pressure to the composite charge within the pressure range.

A further embodiment is a non-transitory computer readable medium embodying programmed instructions which, when executed by a processor, are operable for performing a method of shaping a composite charge with a laminate shear forming machine. The method includes obtaining, from memory, data for positioning forming members of a laminate shear forming machine to a predetermined position for shaping the composite charge, obtaining, from memory, a target pressure value to apply along a length of the composite charge, and monitoring, via a pressure sensing strip disposed between forming members and the composite charge, a pressure value along the length of the composite charge. Further, in response to determining that at least one of the forming members in the predetermined position is applying a pressure value outside a threshold of the target pressure value, the method includes directing the at least one forming member to move from the predetermined position to an adjusted position that applies pressure to the composite charge within the threshold of the target pressure value.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1A:
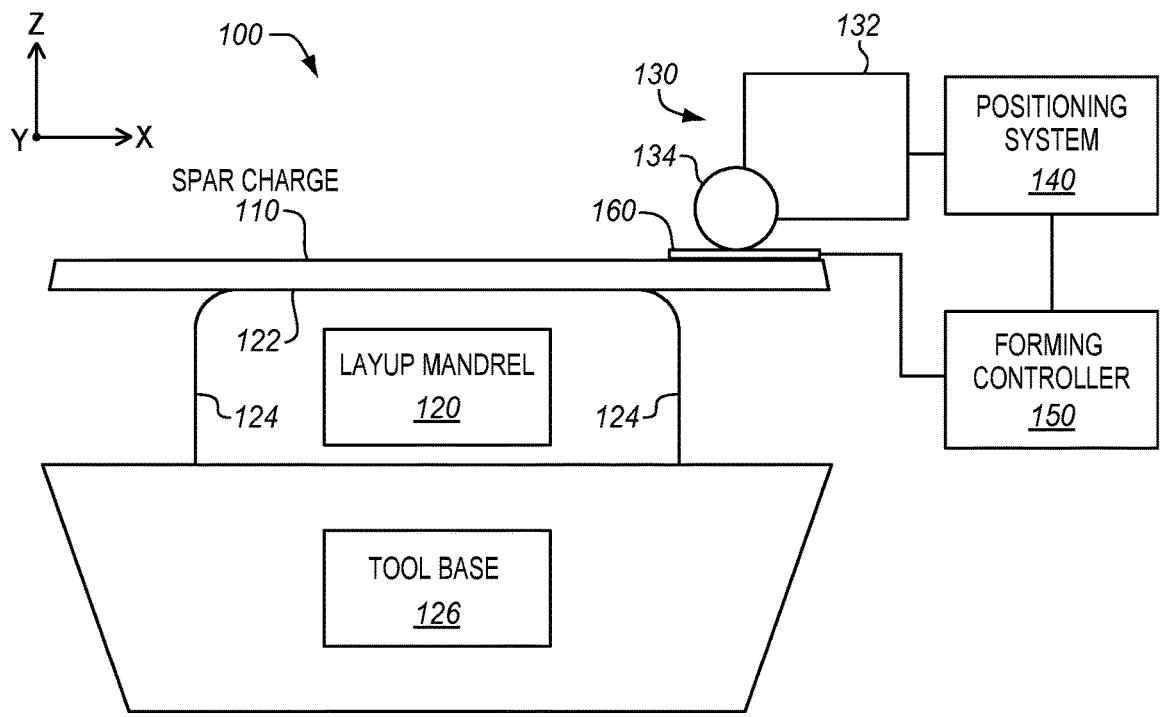
FIG. 1A is a front view of a laminate shear forming machine in an illustrative embodiment.
Figure 1B:
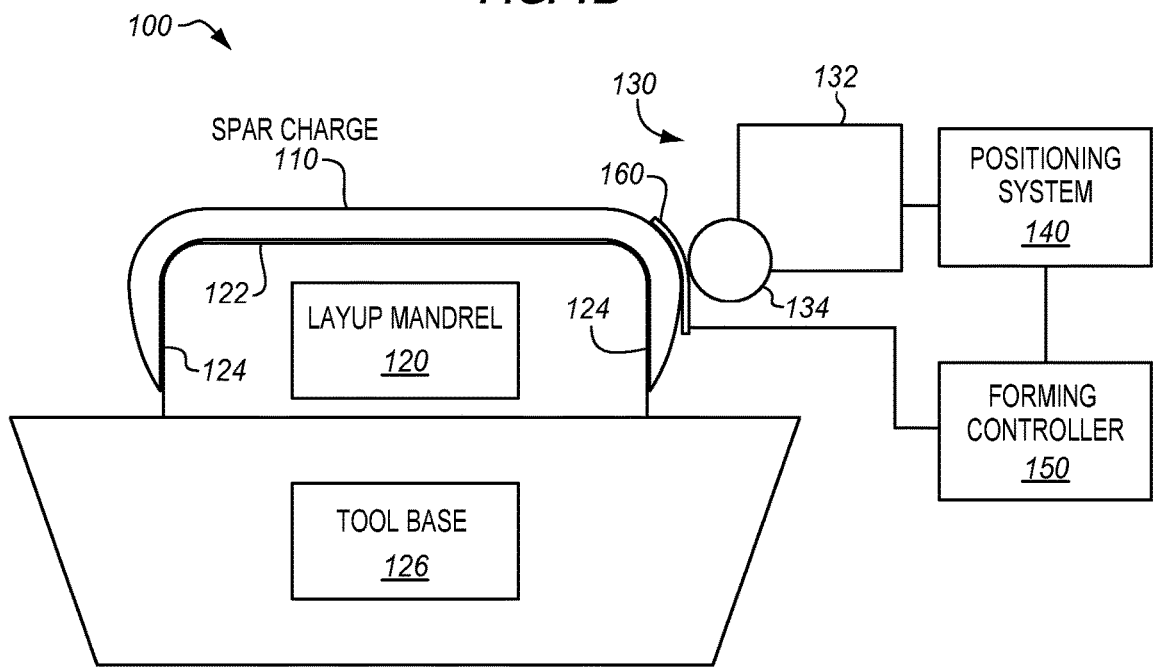
FIG. 1B is a front view of a laminate shear forming machine in another illustrative embodiment.

FIG. 1A is a front view of a laminate shear forming machine 100 in an illustrative embodiment. FIG. 1B is a front view of the laminate shear forming machine 100 in another illustrative embodiment. As shown in FIGS. 1A-1B, the laminate shear forming machine 100 is configured to shape a composite charge 110 using a layup mandrel 120. In particular, the laminate shear forming machine 100 includes one or more forming members 130 to press the composite charge 110 against the layup mandrel 120 to shape the composite charge 110.

In this example, the layup mandrel 120 includes a top surface 122 to support the composite charge 110, and side surfaces 124 that contour from the top surface to provide the surface for shaping the composite charge 110. The layup mandrel 120 is supported on a tool base 126. As shown in FIG. 1A, the composite charge 110 initially comprises a flat or unformed sheet of composite material that overhangs the side surfaces 124 of the layup mandrel 120. Then, as shown in FIG. 1B, the overhanging portion of the composite charge 110 is compressed by the forming member 130 against the side surfaces 124 of the layup mandrel 120 to shape the composite charge 110 into the desired shape of a composite part.

Figure 2:
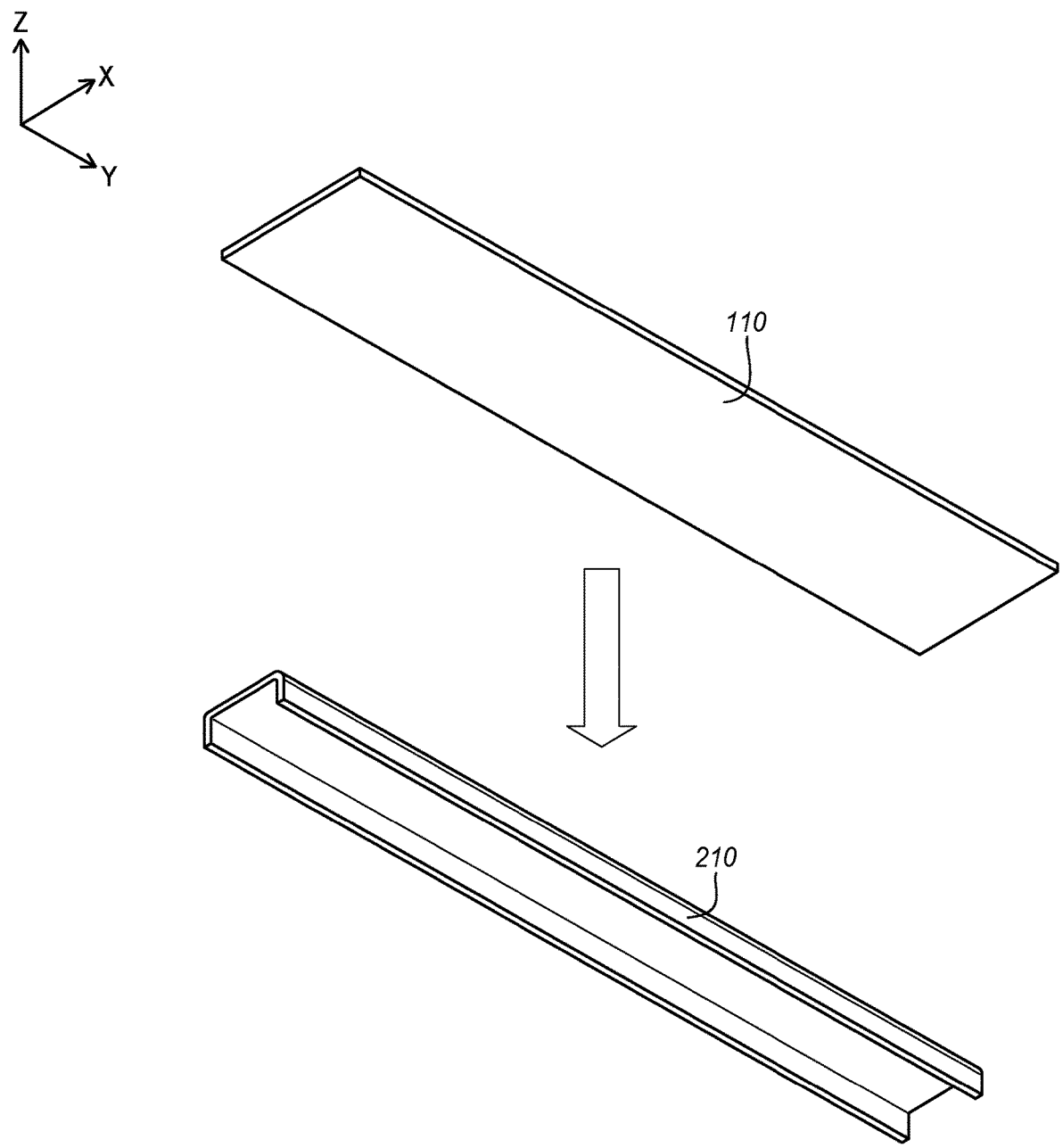
FIG. 2 is a perspective view of a composite charge shaped into a composite part in an illustrative embodiment.

FIG. 2 is a perspective view of the composite charge 110 shaped into a composite part 210 in an illustrative embodiment. Prior to shaping, the composite charge 110 may be laid up as several flat layers or plies of unhardened composite material (e.g., carbon fiber reinforced polymer (CFRP)). During shaping, the laminate shear forming machine 100 applies heat and pressure to conform the composite charge 110 to the layup mandrel 120. After shaping, the composite charge 110 may be cured and hardened into the composite part 210 (e.g., in an autoclave). In this example, the composite part 210 is an aircraft spar, though it will be appreciated that the layup mandrel 120 may include alternative shapes and that the laminate shear forming machine 100 may form alternative composite parts.

Returning to FIGS. 1A-1B, the forming member 130 moves to press the composite charge 110 against the layup mandrel 120 via a positioning system 140. In one embodiment, each forming member 130 includes a beam 132 and a hose 134 (e.g., a fire hose). Prior to shaping, the hose 134 is inflated, and the layup mandrel 120 is brought up into the laminate shear forming machine 100 (e.g., in the z-direction via the positioning system 140 or another positioning system). Then, to shape the composite charge 110, the positioning system 140 actuates the beam 132 to move toward the side surfaces 124 of the layup mandrel 120 (e.g., in the x-direction) to press the hose 134 into the composite charge 110 and against the layup mandrel 120. The laminate shear forming machine 100 may also include heat elements, not shown for simplicity, to apply heat to the composite charge 110 to shape and/or harden the material.

As the laminate shear forming machine 100 forms the composite charge 110, plies within the composite charge 110 slip relative to each other in response to forces applied by the layup mandrel 120 and the forming member 130. However, in current laminate shear forming machines, the forming members may apply force inconsistently along the length of the composite charge (e.g., in the y-direction), causing discrepancies in shear movement of the plies and potentially causing wrinkles or weak spots in the shaped material. Applying force evenly along the composite charge is especially difficult in forming parts with complex or curved geometries. For example, in forming an aircraft spar that is curved along its length, it is difficult to set the position of the forming members correctly to consistently apply force along the curve.

In view of the foregoing problems, the laminate shear forming machine 100 is enhanced with a forming controller 150 and one or more pressure sensing strips 160. In particular, the pressure sensing strips 160 are configured to detect pressure being applied to the composite charge 110, and the forming controller 150 is configured to direct the positioning system 140 to dynamically adjust the position of the forming members 130 based on pressure measurements obtained by the pressure sensing strips 160. In some embodiments, the pressure sensing strip 160 may include a force sensing linear potentiometer having a flexible, thin profile so as not to interrupt the contact force of the forming member 130 against the composite charge 110 during shaping with the laminate shear forming machine 100. For example, as shown in FIG. 1B, the pressure sensing strip 160 may flexibly contour with the composite charge 110 under the contacting force applied by the hose 134.

Advantageously, the forming controller 150 and the pressure sensing strips 160 facilitate applying precise and/or consistent pressure with the forming members 130 along the length of the composite charge 110 (e.g., in the y-direction). Therefore, compared with existing laminate shear forming machines, the laminate shear forming machine 100 provides a technical benefit in producing composite parts with improved reliability, reproducibility, and pressure adjustability during the forming process.

Figure 3:
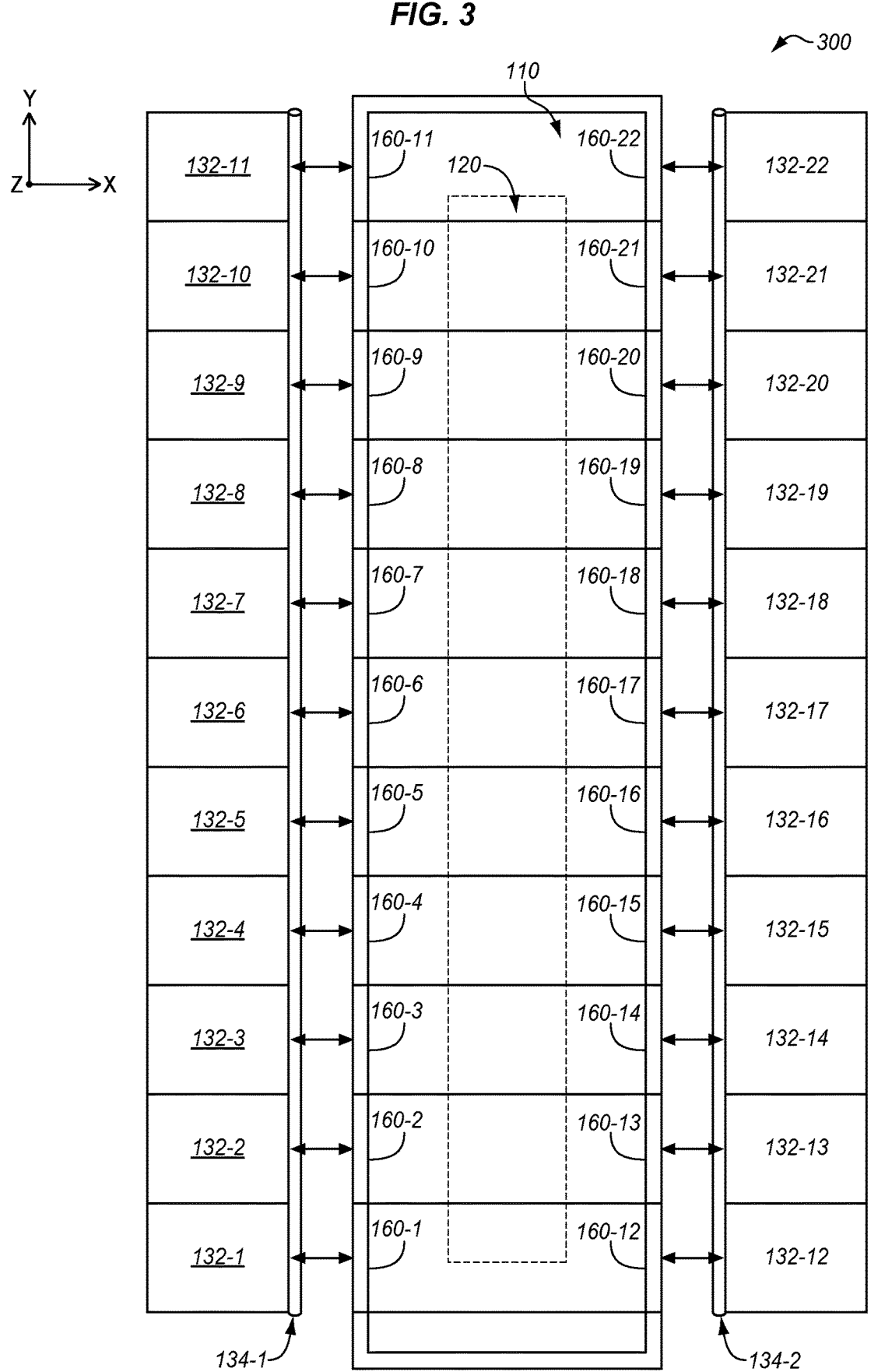
FIG. 3 is a top view of a laminate shear forming machine in an illustrative embodiment.

FIG. 3 is a top view of a laminate shear forming machine 300 in an illustrative embodiment. As shown in FIG. 3, the laminate shear forming machine 300 includes the composite charge 110 placed over the layup mandrel 120, and a plurality of forming members arranged side by side and disposed along a length of the layup mandrel 120 and the composite charge 110 at either side. In particular, a first series of beams 132-1 through 132-11 and a first hose 134-1 are disposed along a length (e.g., in the y-direction) of the layup mandrel 120 and the composite charge 110 at a left side thereof. Similarly, a second series of beams 132-12 through 132-22 and a second hose 134-2 are disposed along the length of the layup mandrel 120 and the composite charge 110 at a right side.

The beams 132 actuate in a lateral direction (e.g., in the x-direction) toward and away sides of the layup mandrel 120 and the composite charge 110, as indicated by the double arrows in FIG. 3. The hoses 134 may be attached and/or disposed across front surfaces of their respective series of beams 132. Accordingly, the first series of beams 132-1 through 132-11 collectively position the first hose 134-1 to shape one side of the composite charge 110, and the second series of beams 132-12 through 132-22 collectively position the second hose 134-2 to shape the other side of the composite charge 110. The beams 132 may be independently controlled to various such positions such that the lateral position of each beam 132 defines a force applied to a section of length of the composite charge 110. Although FIG. 3 shows the layup mandrel 120 and the composite charge 110 having a rectangular shape for simplicity, it will be appreciated that formation of composite parts having more complex geometries is contemplated, including parts that curve left/right (e.g., in the x-direction) along its length.

Additionally, the laminate shear forming machine 300 is enhanced with a plurality of pressure sensing strips 160. In particular, a first series of pressure sensing strips 160-1-160-11 are disposed along the length of the composite charge 110 at a left side thereof to measure pressure of corresponding ones of the first series of beams 132-1-132-11. And, a second series of pressure sensing strips 160-12 through 160-22 are disposed along the length the composite charge 110 at a right side to measure pressure of corresponding ones of the second series of beams 132-12 through 132-22. The pressure sensing strips 160 may be thus disposed at sections along the length of the composite charge 110 and/or the layup mandrel 120 to correspond with the beams 132. The pressure sensing strips 160 may be disposed along the composite charge 110 at locations where the hose 134 contacts the composite charge 110. Alternatively or additionally, the pressure sensing strips 160 may be disposed along the layup mandrel 120 at locations where the composite charge 110 is pressed against sides 124 of the layup mandrel 120.

Figure 4:
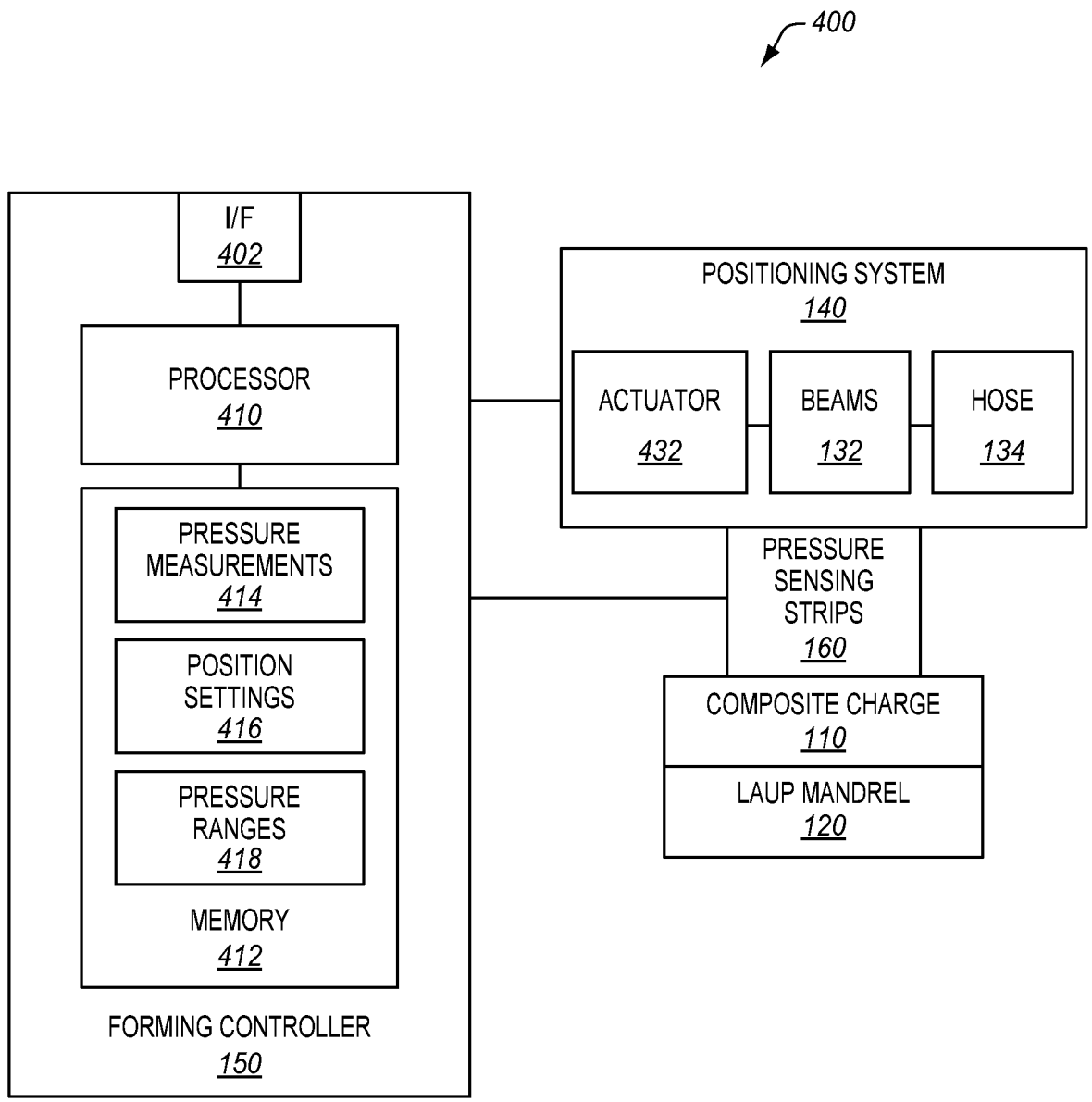
FIG. 4 is a block diagram of a laminate shear forming machine in an illustrative embodiment.

FIG. 4 is a block diagram of a laminate shear forming machine 400 in an illustrative embodiment. As shown in FIG. 4, the pressure sensing strips 160 may be disposed between components of the positioning system 140 and the composite charge 110. The positioning system 140 includes one or more actuators 432 (e.g., servo motor(s)) to drive and position the beams 132. The forming controller 150 is communicatively coupled with the positioning system 140 to direct the actuator(s) 432 to drive the beams 132 to specific and/or independent locations. The forming controller 150 is also communicatively coupled with the pressure sensing strips 160 to obtain pressure measurements applied to the composite charge 110 by the beams 132 to adjust the position of the beams 132 based on real-time pressure measurements.

The forming controller 150 includes an interface 402, a processor 410, and memory 412. The interface 402 is configured to receive wired or wireless data input for controlling the positioning system 140. In particular, the interface 402 may receive, for storage in memory 412, pressure measurements 414 obtained from the pressure sensing strips 160, position settings 416 to initially position the beams 132 with respect to the composite charge 110, and pressure ranges 418 indicating an allowable range of pressure to apply to the composite charge 110.

The forming controller 150 may be implemented by hardware, software, or some combination thereof. For example, the forming controller 150 may include the processor 410 which includes any electronic circuits and/or optical circuits that are able to perform functions. The processor 410 may include one or more Central Processing Units (CPU), microprocessors, Digital Signal Processors (DSPs), Application-Specific Integrated Circuits (ASICs), Programmable Logic Devices (PLD), control circuitry, etc. Some examples of processors include Intel® Core™ processors, Advanced Reduced Instruction Set Computing (RISC) Machines (ARM®) processors, etc. The forming controller 150 may also include memory 412, which may include any electronic circuits, optical circuits, and/or magnetic circuits that are able to store data.

Figure 5:
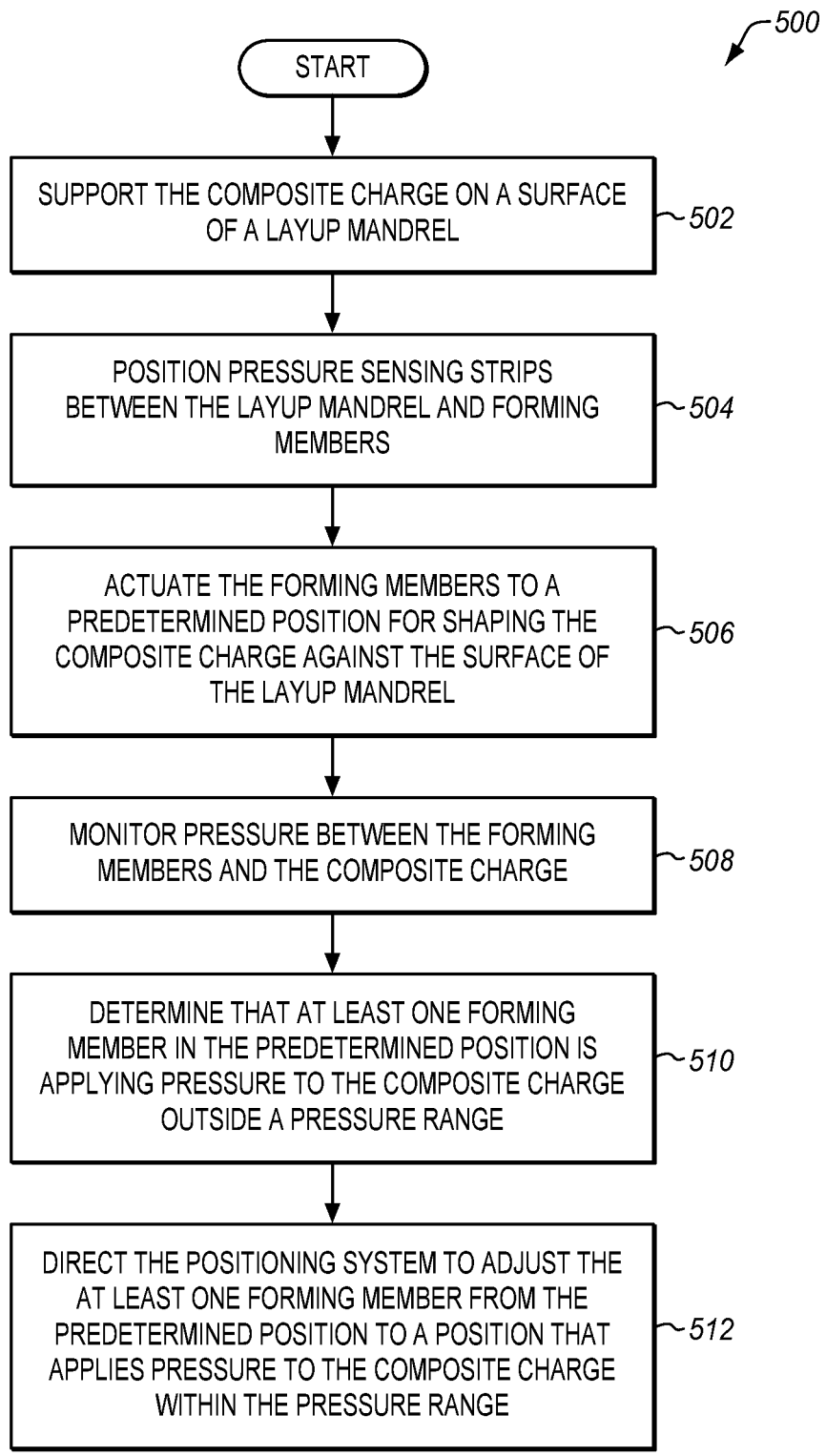
FIG. 5 is a flowchart illustrating a method for forming a composite charge in an illustrative embodiment.

FIG. 5 is a flowchart illustrating a method 500 for forming a composite charge in an illustrative embodiment. The steps of the method 500 are described with reference to the laminate shear forming machines of FIGS. 1A, 1B, 3, and 4, but those skilled in the art will appreciate that the method 500 may be performed in other systems. The steps of the flowcharts described herein are not all inclusive, may include other steps not shown, and may also be performed in an alternative order.

In step 502, the composite charge 110 is supported on a surface of the layup mandrel 120. In step 504, the pressure sensing strips 160 are positioned between the layup mandrel 120 and the forming members 130. In step 506, the forming members 130 are actuated to a predetermined position for shaping the composite charge 110 against the surface of the layup mandrel 120. The predetermined position, or first position, of the forming members 130 may comprise the initial position that the forming controller 150 directs the beams 132 to move to based on the position settings 416 for the forming the composite part. The position settings 416 may include, for example, dimensions related to a geometry of the layup mandrel 120 and/or part thickness to produce from the composite charge 110.

In step 508, the forming controller 150 monitors pressure between the forming members 130 and the composite charge 110. That is, the pressure sensing strips 160 provide pressure measurement data to the forming controller 150 as the forming members 130 press against the composite charge 110. In step 510, the forming controller 150 determines that at least one forming member 130 in the predetermined position is applying pressure to the composite charge 110 outside a pressure range. For example, the forming controller 150 may refer to the pressure range 418 indicating a target pressure or range of pressure values for one or more of the forming members 130 to apply as indicated or input by an operator.

In step 512, the forming controller 150 directs the positioning system 140 to adjust the at least one forming member 130 from the predetermined position to a position that applies pressure to the composite charge within the pressure range. Therefore, at least one of the forming members 130 moves to a second position, or adjusted position, that modifies the predetermined position, or first position, that it was set to based on the position settings 416. Steps 508-512 may repeat as necessary during forming of the composite charge 110. Alternatively or additionally, one or more of steps 508-512 may be performed manually by an operator of the laminate shear forming machine. Accordingly, the method 500 provides a technical benefit over prior systems because it dynamically adjusts the position of the forming members 130 during shaping of the composite charge 110 to ensure that the pressure applied along the length of the composite charge 110 is precisely or evenly applied for at each section along the length of the part.

Figure 6:
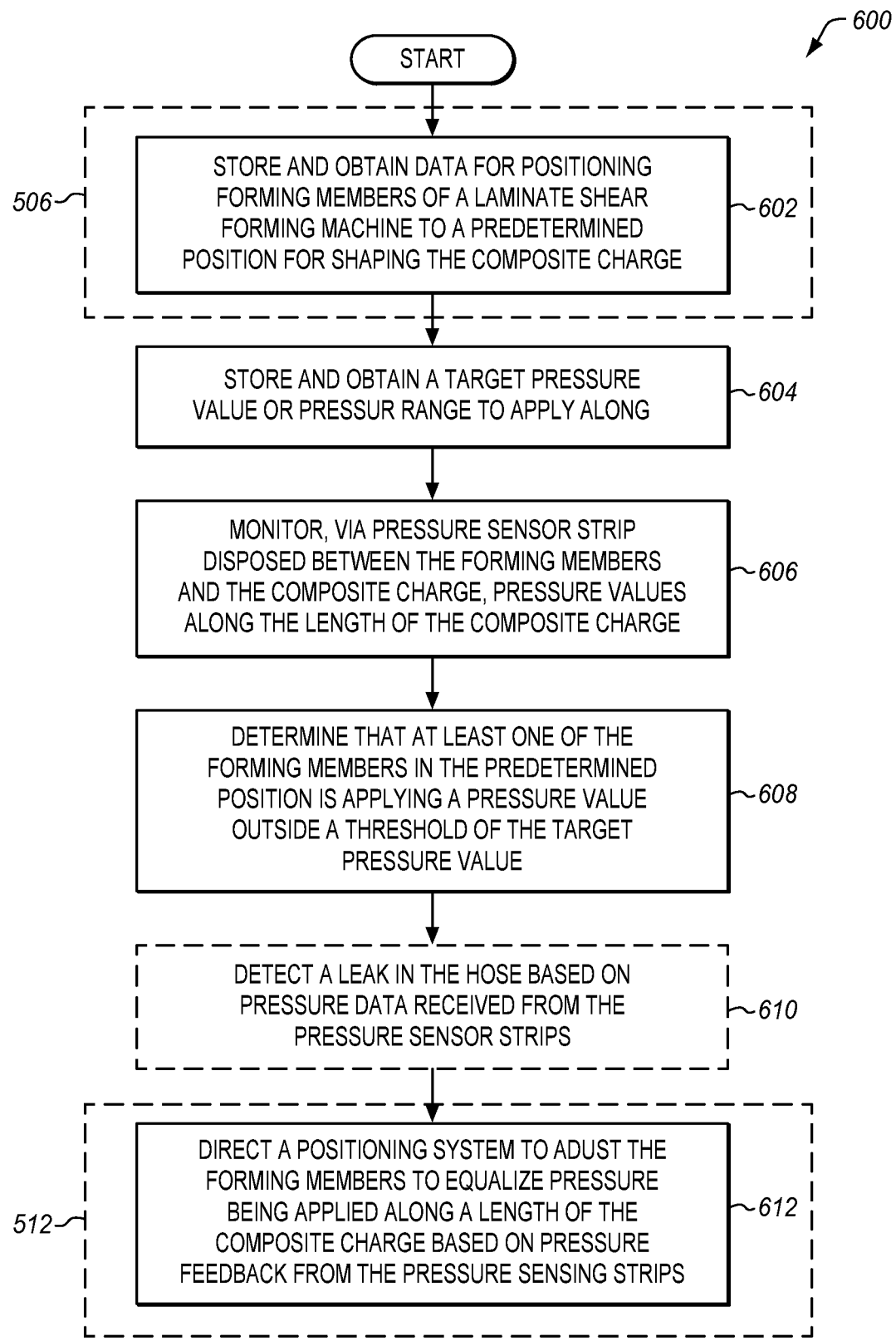
FIG. 6 is a flowchart illustrating a method for forming a composite charge in another illustrative embodiment.

FIG. 6 is a flowchart illustrating a method 600 for forming a composite charge in another illustrative embodiment. The steps of the method 600 are described with reference to the laminate shear forming machines of FIGS. 1A, 1B, 3, and 4 and the method 500 of FIG. 5, but those skilled in the art will appreciate that the method 500 may be performed in other systems and methods.

The method 600 includes additional or alternative steps to that described in the method 500 of FIG. 5. Here, with respect to step 506 of actuating the forming members 130 to predetermined positions, the method 600 includes step 602 in which the forming controller 150 stores and obtains data for positioning the forming members 130 to the predetermined position for shaping the composite charge 110. In other words, the forming controller 150 obtains position settings 416 input by an operator of the laminate shear forming machine.

In step 604, the forming controller 150 stores and obtains a target pressure value or a pressure range to apply along a length of the composite charge 110. Thus, the forming controller 150 may store and/or obtain from memory 412 a pressure range 418 or pressure target value for each of the forming members 130 to apply. The threshold of pressure to apply for a section of length along the composite charge 110 may be input by an operator and include a specific threshold pressure value or include upper and/or lower pressure limits based on the pressure range 418.

In step 606, the forming controller 150 monitors, via the pressure sensing strips 160 disposed between the forming members 130 and the composite charge 110, pressure values along the length of the composite charge 110. In step 608, the forming controller 150 determines that at least one of the forming members 130 in the predetermined position is applying a pressure value outside a threshold of the target pressure value. Optionally, in step 610, the forming controller 150 detects a leak in the hose 134 based on pressure data received from the pressure sensing strips 160. With respect to the method 500 and step 512 of directing the forming members 130 to adjust, the method 600 includes step 612 in which the forming controller 150 directs the positioning system 140 to adjust the forming member 130 to equalize pressure being applied along a length of the composite charge 110 based on pressure feedback from the pressure sensing strips 160. Thus, the method 600 provides a technical benefit over prior systems because it forms the composite part by dynamically adjusting the applied pressure to equal amounts along the length of the composite charge 110.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof

What is claimed is:

1. A laminate shear forming machine for shaping a composite charge, comprising:
    a layup mandrel including a surface configured to shape the composite charge;
    forming members configured to press the composite charge against the surface of the layup mandrel to shape the composite charge;
    pressure sensing strips configured to measure pressure between the forming members and the composite charge; and
    a forming controller coupled to the pressure sensing strips and configured to determine that at least one forming member is applying pressure to the composite charge outside a pressure range, and to direct the at least one forming member to adjust from a first position to a second position to apply pressure to the composite charge within the pressure range.

2. The laminate shear forming machine of claim 1 wherein:
    the forming controller is configured to direct a positioning system to adjust the forming members to equalize pressure being applied along a length of the composite charge based on pressure feedback from the pressure sensing strips.

3. The laminate shear forming machine of claim 1 wherein:
    the forming members include beams arranged side by side along a length of the layup mandrel and configured to actuate individually toward a side of the layup mandrel, and also include a hose attached to the beams and disposed along the length of the layup mandrel, and
    the pressure sensing strips are disposed between the hose and the composite charge.

4. The laminate shear forming machine of claim 1 further comprising:
    a positioning system configured to actuate the forming members to a predetermined position based at least in part on a part thickness of the composite charge,
    wherein, responsive to determining that the least one forming member in the predetermined position is applying pressure to the composite charge outside a pressure range, the forming controller is configured to direct the least one forming member from the predetermined position to an adjusted position that applies pressure to the composite charge within the pressure range.

5. The laminate shear forming machine of claim 1 wherein:
    the forming members are disposed along a length of the layup mandrel on either side of the layup mandrel.

6. The laminate shear forming machine of claim 1 wherein:
    the layup mandrel includes a top surface to support the composite charge, and side surfaces that contour from the top surface to provide the surface for shaping the composite charge, and
    the forming members are configured to press the composite charge against the side surfaces of the layup mandrel to shape the composite charge.

7. The laminate shear forming machine of claim 6 wherein:
    the side surfaces of the layup mandrel contour in a direction perpendicular from the top surface, and
    the forming members are configured to shape the composite charge into an aircraft spar.

8. A method of shaping a composite charge with a laminate shear forming machine, comprising:
    supporting the composite charge on a surface of a layup mandrel;
    positioning pressure sensing strips between the layup mandrel and forming members;
    actuating the forming members to a predetermined position for shaping the composite charge against the surface of the layup mandrel;

monitoring, with the pressure sensing strips, pressure between the forming members and the composite charge; and in response to determining that at least one forming member in the predetermined position is applying pressure to the composite charge outside a pressure range, directing a positioning system to adjust the at least one forming member from the predetermined position to an adjusted position that applies pressure to the composite charge within the pressure range.

9. The method of claim 8 further comprising:
directing a positioning system to adjust the forming members to equalize pressure being applied along a length of the composite charge based on pressure feedback from the pressure sensing strips.

10. The method of claim 8 further comprising:
actuating the forming members to the predetermined position based on a part thickness of the composite charge and a dimension of the layup mandrel.

11. The method of claim 8 further comprising:
storing the pressure range in memory for the composite charge.

12. The method of claim 8 further comprising:
storing the pressure range in memory for each of the forming members of the laminate shear forming machine.

13. The method of claim 8 wherein:
the forming members include beams arranged side by side along a length of the layup mandrel and configured to actuate individually toward a side of the layup mandrel, and also include a hose attached to the beams and disposed on the length of the layup mandrel, and
the pressure sensing strips are disposed between the hose and the composite charge.

14. A non-transitory computer readable medium embodying programmed instructions which, when executed by a processor, are operable for performing a method of shaping a composite charge with a laminate shear forming machine, the method comprising:
obtaining, from memory, data for positioning forming members of a laminate shear forming machine to a predetermined position for shaping the composite charge;
obtaining, from memory, a target pressure value to apply along a length of the composite charge;

monitoring, via a pressure sensing strip disposed between the forming members and the composite charge, a pressure value along the length of the composite charge; and in response to determining that at least one of the forming members in the predetermined position is applying a pressure value outside a threshold of the target pressure value, directing the at least one forming member to move from the predetermined position to an adjusted position that applies pressure to the composite charge within the threshold of the target pressure value.

15. The medium of claim 14 wherein the method further comprises:
directing a positioning system to adjust the at least one forming member to the adjusted position to equalize pressure being applied by the forming members along a length of the composite charge.

16. The medium of claim 14 wherein the method further comprises:
directing a positioning system to actuate the forming members to the predetermined position based on a part thickness of the composite charge and a dimension of a layup mandrel.

17. The medium of claim 14 wherein the method further comprises:
storing the target pressure value in memory for the composite charge.

18. The medium of claim 14 wherein the method further comprises:
storing the target pressure value in memory for each of the forming members of the laminate shear forming machine.

19. The medium of claim 14 wherein:
the forming members include beams arranged side by side along a length of a layup mandrel and configured to actuate individually toward a side of the layup mandrel, and also include a hose attached to the beams and disposed along the length of the layup mandrel, and
the pressure sensing strips are disposed between the hose and the composite charge.

20. The medium of claim 19 wherein the method further comprises:
detecting a leak in the hose based on pressure data received from the pressure sensing strips.

* * * * *